United States Patent [19]

Aymerich et al.

[11] Patent Number: 5,411,309
[45] Date of Patent: May 2, 1995

[54] AUTOMOBILE SUN VISOR

[75] Inventors: José Aymerich; Jesûs Prat, both of Rubi, Spain

[73] Assignee: Fico I.T.M. S.A., Barcelona, Spain

[21] Appl. No.: 129,142
[22] PCT Filed: Jan. 28, 1993
[86] PCT No.: PCT/ES93/00005
 § 371 Date: Oct. 4, 1993
 § 102(e) Date: Oct. 4, 1993
[87] PCT Pub. No.: WO93/14950
 PCT Pub. Date: Aug. 5, 1993

[30] Foreign Application Priority Data

Feb. 4, 1992 [ES] Spain ................................. 9200217

[51] Int. Cl.⁶ .................................................. B60J 3/00
[52] U.S. Cl. ............................................ 296/97.1; 29/91
[58] Field of Search ................... 296/97.1; 29/91, 91.1, 29/91.6, 91.7

[56] References Cited

U.S. PATENT DOCUMENTS

| | | |
|---|---|---|
| 2,901,038 | 8/1959 | Herr et al. ............... 296/97.1 X |
| 4,458,938 | 7/1984 | Viertel et al. ............... 296/97.1 |
| 4,570,990 | 2/1986 | Flowerday ............... 296/97.1 |
| 4,822,095 | 4/1989 | Svensson ............... 296/97.1 |

FOREIGN PATENT DOCUMENTS

| | | |
|---|---|---|
| 0456573 | 11/1991 | European Pat. Off. . |
| 2665397 | 2/1992 | France . |
| 3713475 | 10/1988 | Germany . |
| 0249088 | 10/1987 | Japan ............... 29/91 |
| 0114514 | 5/1989 | Japan ............... 296/97.1 |

Primary Examiner—Dennis H. Pedder
Attorney, Agent, or Firm—Michael J. Striker

[57] ABSTRACT

An automobile sun visor has a visor body, an internal structural member arranged in the visor body and having shorter sides, a retaining clip attached to one of the shorter sides of the internal structural member and having arms provided with front edges which are flush with an outer surface of a side of the sun visor body, and a longitudinal bag-shaped sheath which covers an outer surface of the visor body and has a free end which forms a joint line on the front edges of the arms of the retaining clip.

5 Claims, 2 Drawing Sheets

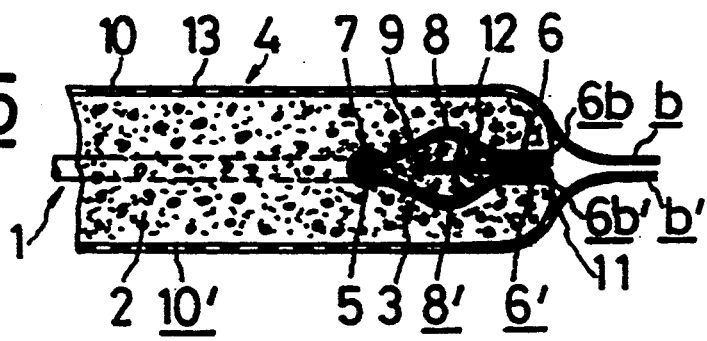
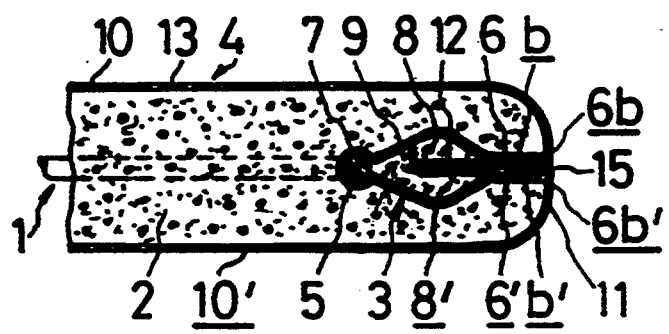
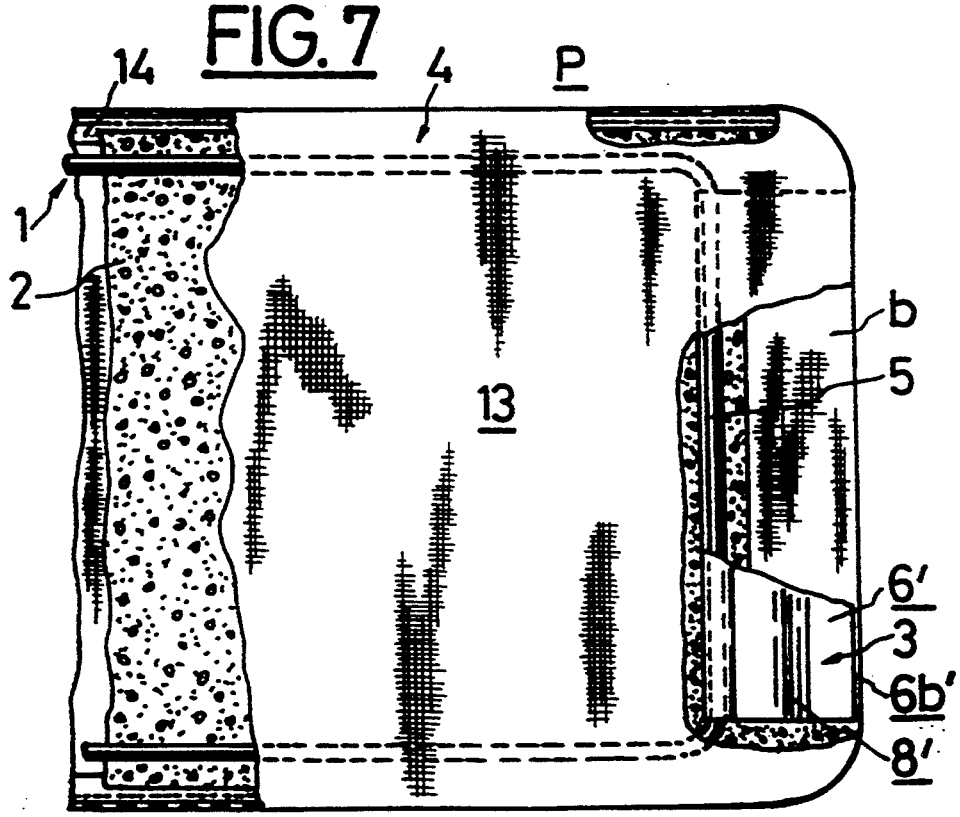

AUTOMOBILE SUN VISOR

BACKGROUND OF THE INVENTION

The present invention relates to an automobile sun visor and more particularly a sun visor having a fabric and/or leather covering.

Automobile sun visors with a metallic structural member of a rectangular form and a sun visor body formed on the structural member by foamed polyurethane are very well known. The final contour of the so-formed sun visor, which is also basically rectangular, mates with the pertinent configuration of the interior of the automobile passenger compartment. These sun visors may comprise, like other visors structured in a different way, the so-called vanity mirror for the passenger side sun visor.

Sun visors are also known in general to include means for their attachment to a bracket member attached to the automobile structure, around the corresponding pivot pin of the bracket member so that the sun visor may occupy any position selected by the user among the regular positions of use. Apart from the pivot means, the sun visors also generally include a hanging bridge disposed in the end opposite to that occupied by the pivot means. The hanging bridge may engage a support member attached to the automobile structure so that, once the hanging bridge is engaged with the support member, under certain conditions they prevent the sun visor support pivot means from being subjected to mechanical overloads which could affect the operation thereof and, more precisely, the positional stability thereof.

The above described sun visors also have an external sheath like covering which consists generally of a covering of the sun visor body with a plastics material such as polypropylene. The purpose of this covering is to confer on the sun visor a surface finish in keeping with the internal finish of the automobile passenger compartment.

Where a very high quality level of the sun visor finish is requirable, the above described plastics material covering is inappropriate in view of the very notable difference of texture to be observed between the plastics material and the fabric and/or leather material used in these cases as covering for the vehicle passenger compartment.

The problems arising for providing a sunvisor of the above described type with an external covering using a woven material or leather are also known. Such problems are mainly to provide such fabric or leather covering with an external finish in which the sewn seams .of the constituent parts may not be perceived either by sight or by touch. In this respect, U.S. Pat. No. 4,822,095 discloses a sun visor having a woven material sheath and a method for the manufacture thereof. The said U.S. Pat. No. 4,822,095 describes a sun visor provided with a woven covering consisting of a sheath of essentially rectangular profile and having the perimeter closed by sewing in which the seam is completely on the inside. The interior of the sheath is accessible, for housing the sun visor body, through an opening formed for such purpose in one of the longer sides of the sheath.

The main drawbacks of the sun visor described in U.S. Pat. No. 4,822,095 are the following: the opening through which the sun visor body is inserted in the sheath is of necessity very large and, once the sun visor body is housed in the sheath, the opening must be covered or concealed with an additional member such as may be the vanity mirror itself. Also there is the need to cover or conceal the sheath opening in both sun visors normally fitted to automobiles, i.e., the driver's side sun visor and the passenger's side sun visor which, obviously, makes the production cost of the sun visors more expensive.

SUMMARY OF THE INVENTION

Accordingly, it is an object of the present invention to provide a sun visor which avoids the disadvantages of the prior art.

In keeping with these objects and with others which will become apparent hereinafter, one feature of the present invention resides, briefly stated, in an automobile sun visor which has a retaining clip arranged in a visor body and attached to one of the shorter sides of an internal structural member, the front edges of the arms of the retaining clip reach flush with the outer surface of the sun visor, the retaining clip acts as a housing and a retainer for a free end of longitudinal bag-shaped sheath which snugly covers the outer surface of the sun visor, and a fine joint line for the free end of the sheath is formed on the front edges of the arms of the retaining clip.

In accordance with the above described features of the sun visor of the invention, the fabric and/or leather material sun visor sheath does not require the presence of any opening on one or the other of the larger sides thereof to allow the insertion of the sun visor body. In this way, the sun visor of the invention solves the above described problems caused by the known sun visor embodiments covered with a woven material sheath. In fact, the sun visor of the invention may be supplied as original equipment with a woven or leather material sheath and with a completely uniform surface finish free from any opening as is required, in general, for the driver's side sun visor. Obviously, the sun visor of the invention may comprise on the corresponding larger side any additional member such as is the vanity mirror of the passenger side sun visor.

The retaining clip is attached to the side of shorter free length of the sun visor structural member positionally opposite to the receiving means for the bracket member pivot pin attached to the vehicle structure. It is disposed inside the sun visor body in such a way that, preferably, both arms of the clip are parallel to the corresponding outer surfaces of the larger sides of the sun visor body.

The bag-like sheath covering the sun visor body is elongate and formed by a textile and/or leather material. The bag has the corresponding open or free longitudinal end, and is shaped by sewing along its joining edges positionally mating with the limit of the perimetrical profile of the sun visor. The seam is directed precisely towards the interior of the bag, defining a fine joint line on the outside.

The retaining clip, which is a one-piece member and is preferably made from a highly resilient sheet steel, is essentially U-shaped and is symmetrical about the longitudinal centre line thereof. The retaining clip comprises on the bottom means for firm attachment to the corresponding side of the sun visor structural member. It forms between its arms, which are transversely coextensive with the said side of the structural member, a housing for snugly receiving the free end of the bag-like sheath covering the sun visor body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 4, 5 and 6 are cross section views of respective successive stages of the covering of the sun visor body with a fabric material sheath.

FIG. 7 is a part cross section view of the sun visor of the invention.

DESCRIPTION OF THE PREFERRED EMBODIMENTS

Figure 1:
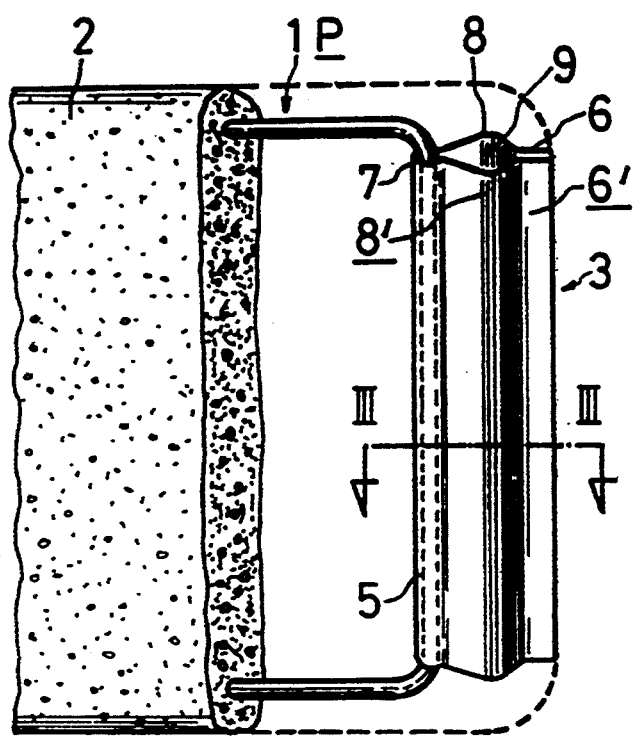
FIG. 1 is a part section view showing the retaining clip attached to the sun visor structural member.

As shown in FIG. 7 of the drawing the sun visor of the invention has a structural member 1, a body 2, a retaining clip 3 and the covering 4.

In this embodiment of the sun visor of the invention, the structural member 1 of the sun visor is formed by a metal rod having a circular cross section and a rectangular shape. In FIGS. 1 and 7, the metal structural member 1 has been shown in part, in particular with its part P which is the portion opposite to the portion attached to the means for receiving the pivot pin of the bracket member of the automobile structure. Such receiving means and bracket member have not been shown in the drawing Figures.

FIGS. 1 and 7 show a side 5 of the metal structural member 1 which is the shorter side adjacent the sun visor hanging bridge. A retaining clip 3 is mounted on the side 5.

Figure 2:
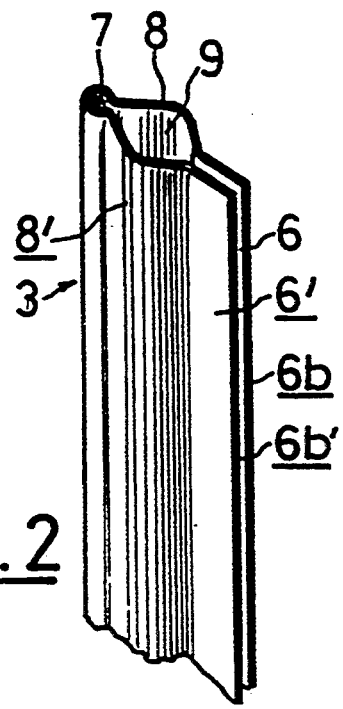
FIG. 2 is a part perspective view of the retaining clip.

The retaining clip 3, as shown in FIGS. 1 and 2, is a one-piece member and is made, preferably, from highly resilient sheet steel of quadrangular shape.

FIGS. 1, 2 and 7 show the retaining clip 3 which is essentially elongate and U-shaped and has arms 6 and 6' extending along the side 5 of the structural member 1. The retaining clip 3 comprises: an essentially circular housing 7 which firmly houses the corresponding portion of the side 5 of the structural member 1 and has on each side of the constituent arms 6 and 6', and has facing projections 8, 8' coextensive with the retaining clip 3 and defining internally a basically circular section passage 9 as shown in FIGS. 1 to 6.

The sun visor body 2 is made from foam polyurethane and, as shown in part in FIGS. 1 and 7, it is essentially rectangular in keeping with the interior of the automobile passenger compartment. In this embodiment of the sun visor of the invention, the profile of the body 2 shown in FIGS. 1 and 7 is given only as an example and it may adopt any other shape in keeping with the interior of the vehicle passenger compartment without this in any way affecting the essence of the invention.

FIGS. 1, 3, 4, 5, 6 and 7 show the metal structural member 1 and the retaining clip 3 totally included within the inside of the sun visor body 2. The internal volume of the retaining clip 3, i.e. the passage 9 and the volume defined between the corresponding facing parallel surfaces of the arms 6 and 6' are fully occupied by the material forming the sun visor body 2.

FIGS. 3, 4, 5, and 6 show how the retaining clip 3 firmly attached to the side 5 of the metal structural member 1, and provided with the arms 6 and 6' which are disposed parallel to the larger sides 10 and 10' of the sun visor body 2.

FIGS. 3, 4, 5, and 6 show the arms 6 and 6', of the retaining clip 3 dimensioned in such a way that the respective front edges 6b and 6b' internally extend up to the surface 11 of the sun visor body 2 facing the front edges 6b and 6b'.

Figure 3:
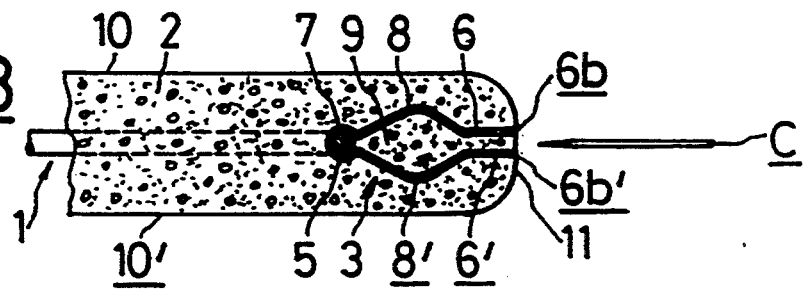
FIG. 3 is a cross section view on the line III—III of FIG. 1.
Figure 4:
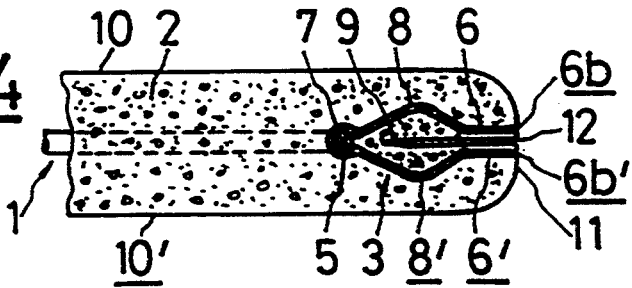

Once the sun visor body 2 has been formed, a blade C shown in FIG. 3 is used to make a relatively small incision 12 which, as shown in FIG. 4, extends centrally and coextensively between the arms 6 and 6' of the retaining clip 3 and extends in depth to the passage 9 formed by the facing projections 8 and 8'.

In this embodiment of the sun visor of the invention, the covering 4 consists of a sheath 13 made from a portion of fabric material of essentially quadrangular shape which has been subjected to a shaping process which includes a folding operation in which said portion is overlapped to give an essentially rectangular shape, a sewing operation of two of the adjacent edges thereof, and, finally, the reversing of the bag-like sheath 13 on itself so as to dispose the seam 14 of sewing of the two said edges on the inside, as shown in FIG. 7. These operations are also applicable where the covering 4 of the sun visor were made from a portion of leather also of quadrangular shape. Obviously, the texture, colour and finish of the covering 4 will be adapted to the specific needs of the automobile passenger compartment in each particular application.

The description of the shaping of the sun visor sheath 13 of the invention given in the foregoing paragraph is given only as a guidance since, as is known, a similar bag shape may be formed in different ways without this affecting in any way the essence of the invention.

The woven material sheath 13 is dimensioned in such a way that its length is longer than the sun visor body 2 in the size of the fringes referenced as b and b' in FIGS. 5, 6 and 7. These fringes b and b' obviously form the open end of the sheath 13.

It is extremely easy to couple the woven material sheath 13 to the sun visor body 2.

First, as shown in part in FIG. 5, the sun visor body 2 is inserted in the sheath 13, in such a way that the fringes b and b' of the sheath 13 are situated in the end of the sun visor body 2 in which there is included the retaining clip 3 and are disposed parallel to the arms 6 and 6' thereof.

Then the woven material sheath 13 completely snugly covers the sun visor body 2 without the seam 14 where the corresponding edges of the sheath 13 are sewn together being noticeable, which seam, as seen in FIG. 7, is comprised between the sun visor body 2 and the sheath 13 itself.

After this using spatulas or metal strips the fringes b and b' of the sheath 13 are inserted in the incision 12 formed between the arms 6 and 6' of the retaining clip 3, as shown in FIGS. 6 and 7.

The arms 6 and 6' of the retaining clip 3, through the material forming the sun visor body 2, by their own resilience firmly retain the fringes b and b' of the sheath 13, pressing one against the other, whereby, under normal conditions of use, they may not come out of their place between the arms 6 and 6' of the retaining clip 3.

Once the sheath 13 has been mounted on the sun visor body 2 as described above, the sun visor is provided with a woven material covering 4 in which the seam 14 of the sheath 13 may neither be seen nor felt. In the front edges 6b and 6b' of the retaining clip 3 a fine joint line 15, shown in FIG. 6 is formed of the free edges b and b' of the sheath 13. And, furthermore, the woven material covering 4 completely covers the outer surface of the sun visor. The covering 4 is free from any opening, unlike the known sun visor embodiments having a fabric or leather material covering.

It will be understood that each of the elements described above, or two or more together, may also find a useful application in other types of constructions differing from the types described above.

While the invention has been illustrated and described as embodied in an automobile sun visor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An automobile sun visor, comprising a visor body; an internal structural member arranged in said visor body and having shorter sides; a retaining clip attached to one of said shorter sides of said internal structural member, said retaining clip having arms provided with front edges which are flush with an outer surface of a side of said sun visor body; and a longitudinal bag-shaped sheath which covers an outer surface of said visor body and has a free end which forms a joint line on said front edges of said arms of said retaining clip, said retaining clip being formed as a one-piece substantially U-shaped member having a substantially circular housing which receives one side of said structural member, two projections extending from both sides of said housing and forming a passage therebetween, said two arms extending from said projections toward said side of said visor body.

2. An automobile sun visor as defined in claim 1, wherein said sun visor body has elongated larger sides, said arms of said retaining clip extending substantially in a direction of elongation of said larger sides of said visor body.

3. An automobile sun visor as defined in claim 1, wherein said bag-like sheath covering said visor body is elongated and has said front edges and a seam which faces an interior of said bag-like sheath.

4. An automobile sun visor as defined in claim 3, wherein said bag-like sheath is composed of a material selected from the group consisting of a textile material and a leather material.

5. An automobile sun visor, comprising a visor body; an internal structural member arranged in said visor body and having shorter sides; a retaining clip attached to one of said shorter sides of said internal structural member, said retaining clip having arms provided with front edges which are flush with an outer surface of a side of said sun visor body; and a longitudinal bag-shaped sheath which covers an outer surface of said visor body and has a free end which forms a joint line on said front edges of said arms of said retaining clip, said retaining clip being a one-piece member symmetrical relative to its longitudinal center axis and having a bottom provided with means for attaching said retaining clip to a side of said structural member, said arms being transversely coextensive with said side of said structural member and extending outwardly from said bottom so as to form therebetween a space in which said free end of said bag-shaped sheath is snugly received.

* * * * *